United States Patent
Jin et al.

(10) Patent No.: US 11,296,367 B2
(45) Date of Patent: Apr. 5, 2022

(54) BATTERY MODULE AND BATTERY PACK CONTAINING SAME

(71) Applicant: LG CHEM, LTD., Seoul (KR)

(72) Inventors: Hee-Jun Jin, Daejeon (KR); Eun-Gyu Shin, Daejeon (KR); Jae-Min Yoo, Daejeon (KR); Jeong-O Mun, Daejeon (KR); Ho-June Chi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 127 days.

(21) Appl. No.: 16/638,876

(22) PCT Filed: Feb. 20, 2019

(86) PCT No.: PCT/KR2019/002080
§ 371 (c)(1),
(2) Date: Feb. 13, 2020

(87) PCT Pub. No.: WO2019/212134
PCT Pub. Date: Nov. 7, 2019

(65) Prior Publication Data
US 2020/0381684 A1    Dec. 3, 2020

(30) Foreign Application Priority Data
May 3, 2018 (KR) .......................... 10-2018-0051135

(51) Int. Cl.
| | |
|---|---|
| *H01M 10/54* | (2006.01) |
| *H01M 10/42* | (2006.01) |
| *H01M 50/209* | (2021.01) |
| *H01M 50/271* | (2021.01) |

(52) U.S. Cl.
CPC ............ *H01M 10/54* (2013.01); *H01M 10/42* (2013.01); *H01M 50/209* (2021.01); *H01M 50/271* (2021.01); *H01M 2220/30* (2013.01)

(58) Field of Classification Search
None
See application file for complete search history.

(56) References Cited

U.S. PATENT DOCUMENTS

| | | | |
|---|---|---|---|
| 5,612,150 A | * | 3/1997 | Nishimura ............ H01M 10/54 |
| | | | 429/49 |
| 2009/0072785 A1 | | 3/2009 | Moon |
| 2013/0108909 A1 | | 5/2013 | Matsuo et al. |
| | | | (Continued) |

FOREIGN PATENT DOCUMENTS

| | | |
|---|---|---|
| CN | 101393974 A | 3/2009 |
| CN | 102934259 A | 2/2013 |
| | (Continued) | |

OTHER PUBLICATIONS

International Search Report for PCT/KR2019/002080 dated May 16, 2019.

(Continued)

*Primary Examiner* — Gregg Cantelmo
(74) *Attorney, Agent, or Firm* — Birch, Stewart, Kolasch & Birch, LLP

(57) ABSTRACT

A battery module which includes a battery cell stack in which a plurality of battery cells are stacked; and a housing configured to accommodate the battery cell stack, wherein a disassembling guide for disassembling the housing is formed at the housing.

14 Claims, 7 Drawing Sheets

(56) References Cited

U.S. PATENT DOCUMENTS

| | | | |
|---|---|---|---|
| 2015/0243950 A1* | 8/2015 | Hara | H01M 50/20 429/99 |
| 2016/0141573 A1* | 5/2016 | Aoki | H01M 50/20 429/53 |
| 2017/0274751 A1 | 9/2017 | Obrist et al. | |
| 2018/0040863 A1 | 2/2018 | Kim et al. | |
| 2019/0006647 A1 | 1/2019 | Ryu et al. | |
| 2019/0350665 A1 | 11/2019 | Furutani et al. | |
| 2021/0091349 A1 | 3/2021 | Terauchi et al. | |

FOREIGN PATENT DOCUMENTS

| | | |
|---|---|---|
| CN | 203013874 U | 6/2013 |
| EP | 2 581 963 A1 | 4/2013 |
| JP | 2000-133231 A | 5/2000 |
| JP | 2000-138043 A | 5/2000 |
| JP | 2000-149894 A | 5/2000 |
| JP | 2000-149895 A | 5/2000 |
| JP | 2001-222984 A | 8/2001 |
| JP | 2003-205933 A | 7/2003 |
| JP | 2007-12528 A | 1/2007 |
| JP | 2010-55955 A | 3/2010 |
| JP | 2010-257709 A | 11/2010 |
| JP | 2011243404 A * | 12/2011 |
| JP | 2014-123467 A | 7/2014 |
| KR | 10-2008-0025424 A | 3/2008 |
| KR | 10-2012-0074375 A | 7/2012 |
| KR | 10-2016-0129596 A | 11/2016 |
| KR | 10-1674348 B1 | 11/2016 |
| KR | 10-2017-0030954 A | 3/2017 |
| KR | 10-2017-0037574 A | 4/2017 |
| KR | 10-2017-0076684 A | 7/2017 |
| WO | WO 2011/155559 A1 | 12/2011 |
| WO | WO 2013/077176 A1 | 5/2013 |
| WO | WO 2018/030846 A1 | 2/2018 |
| WO | WO 2018/128191 A1 | 7/2018 |
| WO | WO 2019/130936 A1 | 7/2019 |

OTHER PUBLICATIONS

Extended European Search Report for European Application No. 19795811.9, dated Feb. 3, 2021.

* cited by examiner

Prior Art

BATTERY MODULE AND BATTERY PACK CONTAINING SAME

TECHNICAL FIELD

The present application claims priority to Korean Patent Application No. 10-2018-0051135 filed on May 3, 2018 in the Republic of Korea, the disclosures of which are incorporated herein by reference.

The present disclosure relates to a battery module and a battery pack including the battery module, and more particular, to a battery module, which allows a housing to be disassembled without damaging battery cells, and a battery pack including the battery module.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same. In addition, various kinds of secondary batteries include a housing capable of protecting the battery cells.

FIG. 1 is a schematic perspective view and a partially enlarged view showing that a side plate and an upper plate of a housing are coupled in a conventional battery module.

Referring to FIG. 1, in a housing 2 of a conventional battery module 1, a side plate 3 and an upper plate 4 are coupled to each other by welding at ends thereof (see also the partially enlarged view of FIG. 1). In addition, if the expected life of the battery module 1 is completed, the housing 2 is disassembled to remove battery cells 5 accommodated in the housing 2. At this time, when the bonded portion between the side plate 3 and the upper plate 4 is cut using a grinder, the battery cells 5 may be damaged due to shock or the like generated from the grinder, which may lead to a fire. In order to prevent fire from being caused by the damage of the battery cells 5, it is necessary to discharge the battery cell 5 by using a salt water before the housing 2 is disassembled.

However, in the conventional technology, since the battery cells 5 must be treated with a salt water, cost and time are required for the treatment. In addition, it is not easy to carry out the salt water treatment process. Moreover, since all the battery cells are treated with a salt water, even though some of the plurality of battery cells are reusable, it is fundamentally impossible to reuse the battery cells 5 due to the salt water treatment.

DISCLOSURE

Technical Problem

The present disclosure is directed to providing a battery module, which allows a housing to be disassembled without damaging battery cells, and a battery pack including the battery module.

In addition, the present disclosure is directed to providing a battery module, which does not need to treat the battery cells with a salt water and thus allows to reuse the battery cells since fire is prevented from occurring due to the damage of the battery cells while the housing is disassembled, and a battery pack including the battery module.

Technical Solution

In one aspect of the present disclosure, there is provided a battery module, comprising: a battery cell stack in which a plurality of battery cells are stacked; and a housing configured to accommodate the battery cell stack, wherein a disassembling guide for disassembling the housing is formed at the housing.

Also, the housing may include an upper cover, a lower cover and a side cover, and the disassembling guide may be formed at the side cover.

In addition, the disassembling guide may be a guide groove formed along a length direction at one end of the side cover.

Also, the guide groove may be formed at a center portion of an upper end of the side cover.

In addition, the upper cover may be formed to be bent and coupled to the side cover.

Also, the upper cover may include a first coupling portion coupled to an upper side of the side cover; and a second coupling portion bent from the first coupling portion and coupled to a side surface of the side cover.

In addition, a placing groove may be formed at the side surface of the side cover so that the second coupling portion is placed therein.

Also, the upper cover may be coupled to the side cover by welding at the second coupling portion.

In addition, the first coupling portion may include: an outer side portion configured to contact the side cover in a region close to the second coupling portion based on the guide groove; and an inner side portion configured to contact the side cover in a region far from the second coupling portion based on the guide groove, wherein the first coupling portion may be coupled to the side cover by welding at the outer side portion.

Also, a cutting introduction groove having a smaller size than the guide groove may be formed in the first coupling portion at a location corresponding to the guide groove.

The disassembling guide comprises a groove formed in the side cover, the groove dividing the side cover into an inner portion and an outer portion, and the upper cover is bonded to the outer portion of the side cover and not bonded to the inner portion of the side cover. The groove is formed in a top edge of the side cover.

Meanwhile, in another aspect of the present disclosure, there is also provided a battery pack, which comprises the battery module described above.

Advantageous Effects

According to the embodiments of the present disclosure, the housing may be disassembled without damaging the battery cells by using the disassembling guide formed at the housing.

In addition, since fire is prevented from occurring due to the damage of the battery cells while the housing is disassembled, it is not needed to treat the battery cells with a salt water and thus the battery cells may be reused.

BEST MODE

Figure 1:
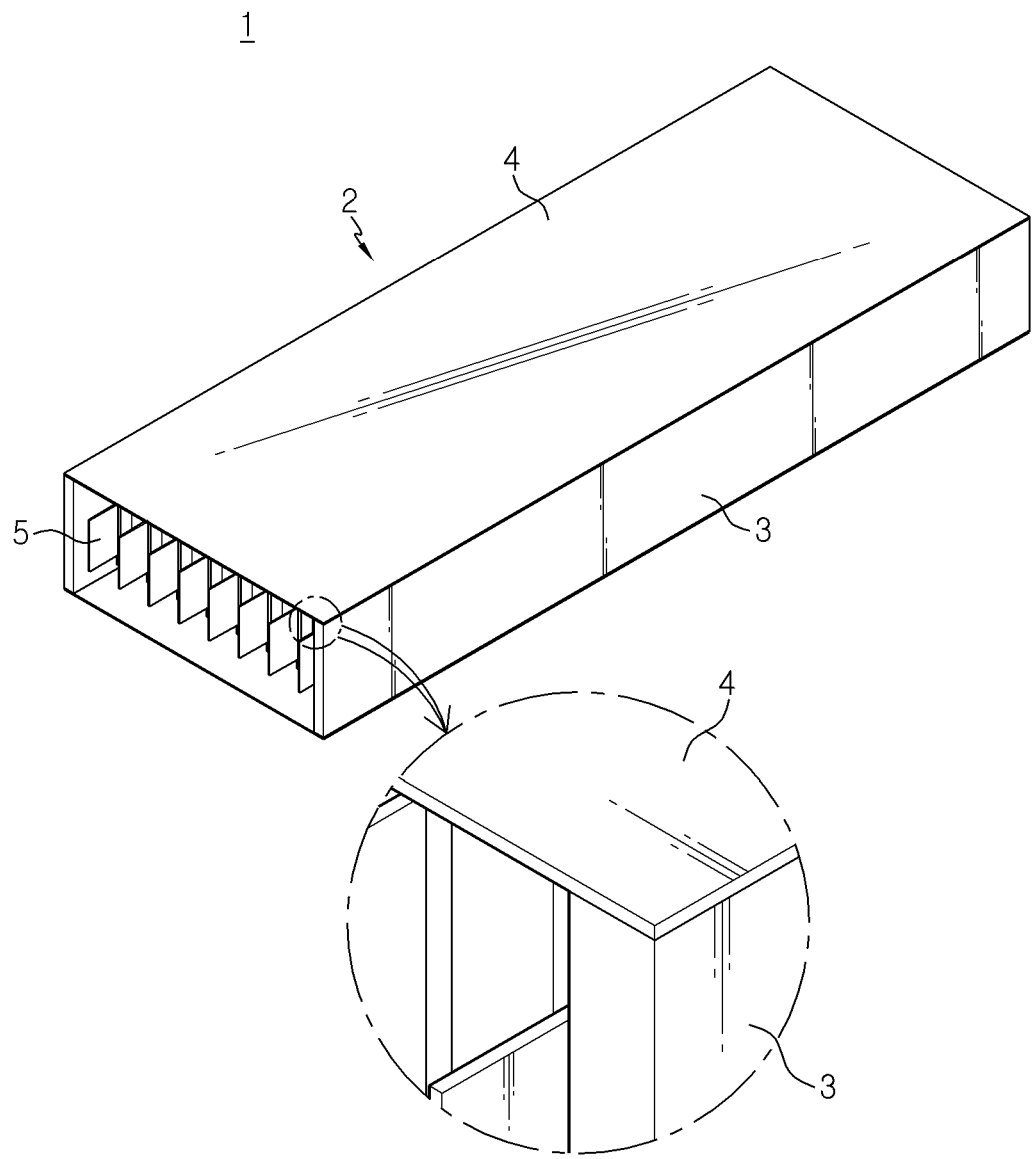
FIG. 1 is a schematic perspective view and a partially enlarged view showing that a side plate and an upper plate of a housing are coupled in a conventional battery module.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 2:
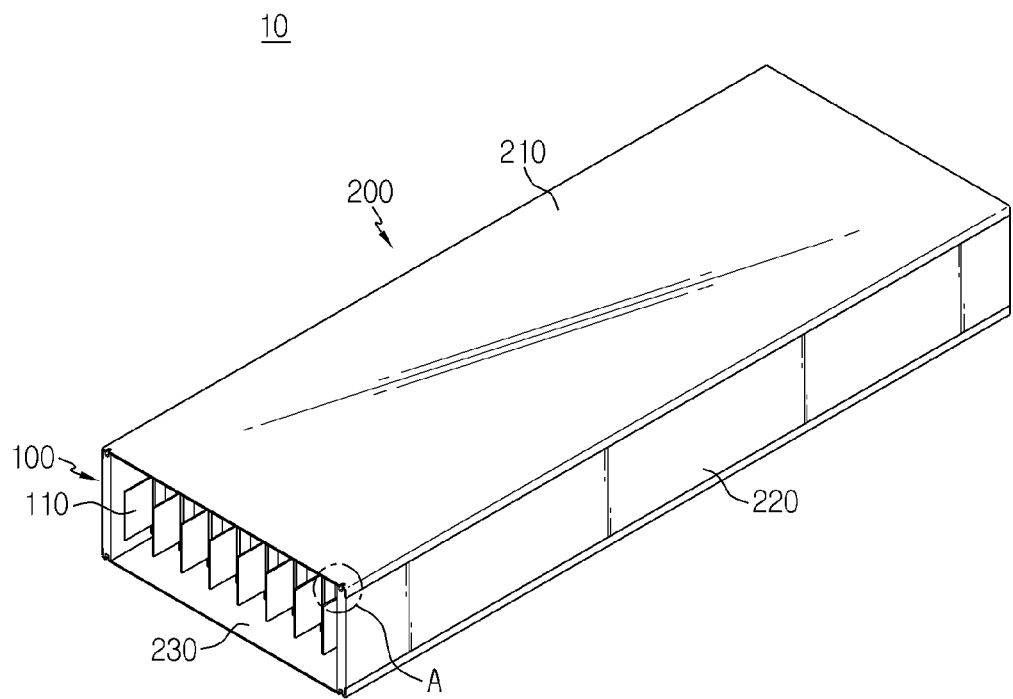
FIG. 2 is a schematic perspective view showing an entire battery module according to an embodiment of the present disclosure.
Figure 3:
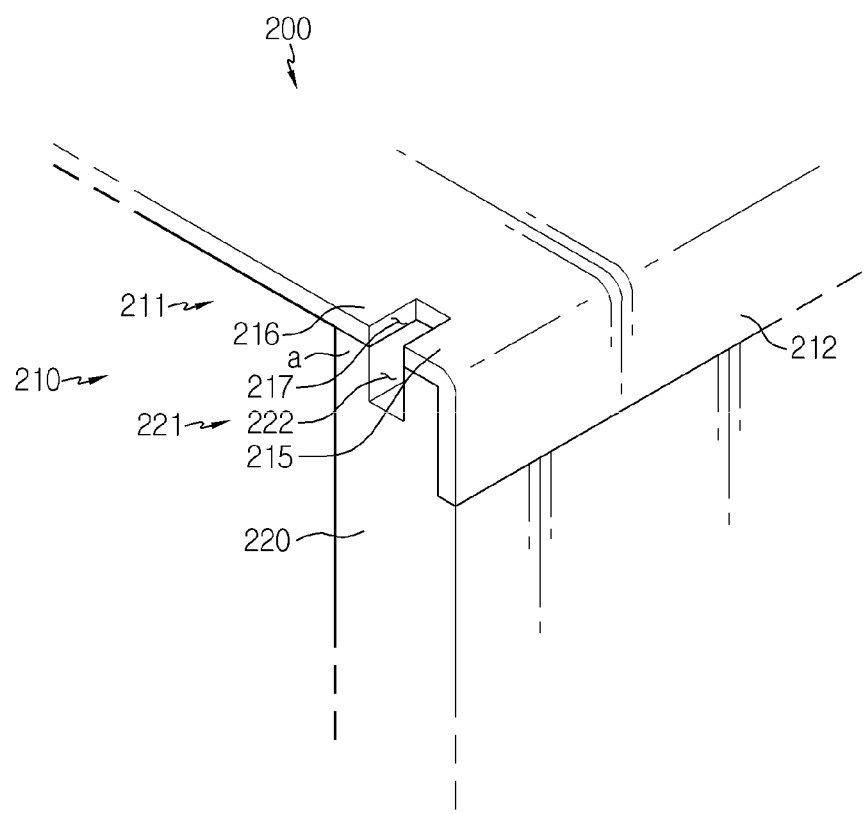
FIG. 3 is an enlarged view showing a portion A of FIG. 2.
Figure 4:
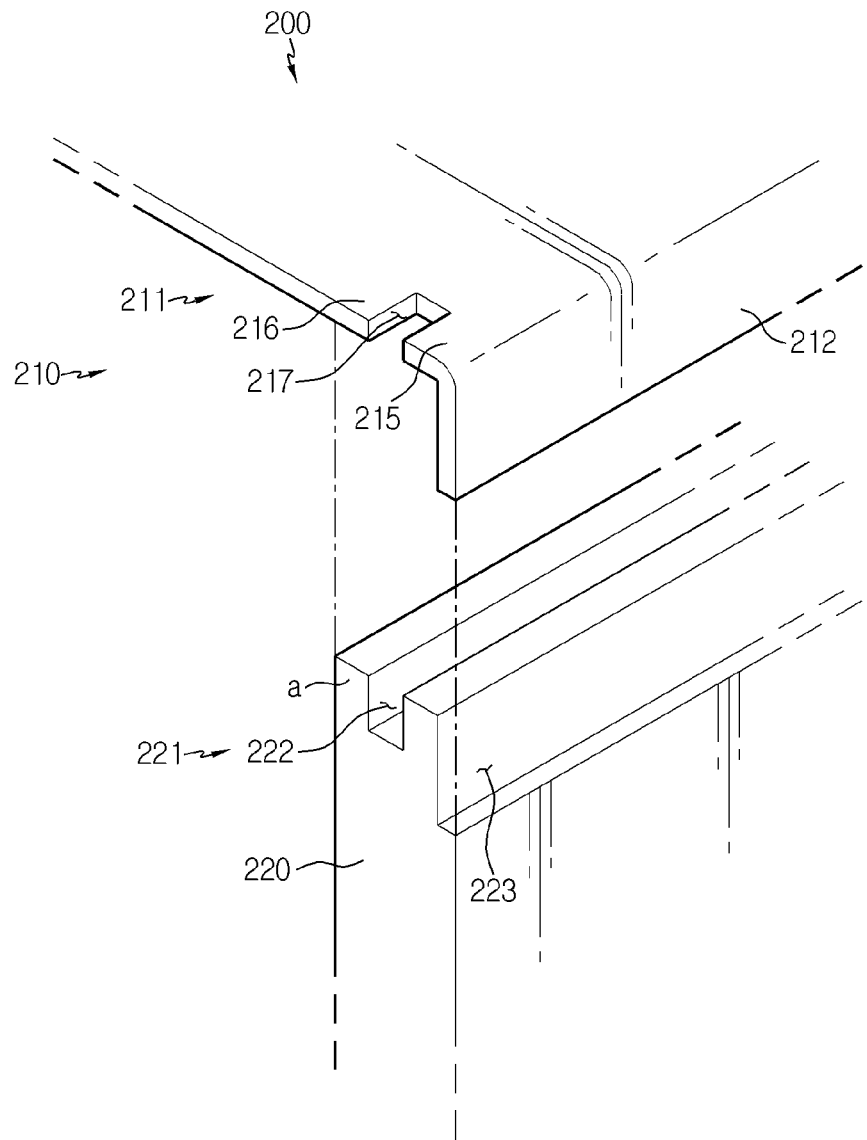
FIG. 4 is a schematic perspective view showing a state before the upper cover is coupled to the side cover in FIG. 3.

FIG. 2 is a schematic perspective view showing an entire battery module according to an embodiment of the present disclosure, FIG. 3 is an enlarged view showing a portion A of FIG. 2, and FIG. 4 is a schematic perspective view showing a state before the upper cover is coupled to the side cover in FIG. 3.

Referring to FIGS. 2 to 4, a battery module 10 according to an embodiment of the present disclosure includes a battery cell stack 100 and a housing 200, and a disassembling guide 221 is formed at the housing 200.

The battery cell stack 100 includes a plurality of stacked battery cells 110. The battery cell 110 may have various structures, and the plurality of battery cells 110 may be stacked in various ways. The battery cell 110 may have a structure in which a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity.

The battery cell 110 may include an electrode lead. The electrode lead is a kind of terminal exposed to the outside and connected to an external device and may be made of a conductive material. The electrode lead may include a positive electrode lead and a negative electrode lead. The positive electrode lead and the negative electrode lead may be disposed at opposite sides of the battery cell 110 in the longitudinal direction, or the positive electrode lead and the negative electrode lead may be disposed at the same side the battery cell 110 in the longitudinal direction.

The battery cell stack 100 may include a plurality of cartridges (not shown) for accommodating the battery cells 110, respectively. Each cartridge (not shown) may be fabricated by injection-molding plastic, and a plurality of cartridges (not shown) having an accommodation portion for accommodating the battery cell 110 may be stacked. A cartridge assembly in which a plurality of cartridges (not shown) are stacked may include a connector element or a terminal element. The connector element may include various types of electrical connecting components or connecting components for connecting to, for example, a battery management system (BMS) (not shown) capable of providing data on voltage or temperature of the battery cells 110. In addition, the terminal element includes a positive electrode terminal and a negative electrode terminal as main terminals connected to the battery cell 110, and the terminal element may have a terminal bolt to be electrically connected to the outside. Meanwhile, the battery cell 110 may have various shapes.

The housing 200 is configured to accommodate the battery cell stack 100. Here, referring to FIG. 2, the housing 200 may include an upper cover 210, a lower cover 230 and a side cover 220, and the battery cell stack 100 may be accommodated in an inner space defined by the upper cover 210, the lower cover 230 and the side cover 220. The lower cover 230 and the side cover 220 may be integrally formed. Alternatively, the lower cover 230 and the side cover 220 may be prepared separately and then coupled by welding or the like. However, the upper cover 210 is prepared to be separated from the side cover 220 and then welded to the side cover 220. Meanwhile, the disassembling guide 221, explained later, may be formed at a position of the side cover 220, which is coupled to the lower cover 230, or may be formed at a position of the side cover 220, which is coupled to the upper cover 210, or may be formed at all positions of the side cover 220, which are coupled to both the upper cover 210 and the lower cover 230. Here, if the disassembling guide 221 is formed at a position of the side cover 220, which is coupled with the lower cover 230, the lower cover 230 and the side cover 220 are prepared separately and then coupled by welding or the like.

A disassembling guide 221 (see FIGS. 3 and 4) for disassembling the housing 200 may be formed at the side cover 220 of the housing 200. Referring to FIG. 4, the disassembling guide 221 may be a guide groove 222 formed along the length direction at one end of the side cover 220, for example at a center portion of an upper end of the side cover 220. As explained later, the guide groove 222 may guide the movement of a grinding stone provided to a grinder. That is, a worker may cut the upper cover 210 while moving the grinding stone along the guide groove 222. However, the tool for cutting the upper cover 210 is not necessarily limited to the grinder, and the upper cover 210 may be cut in various ways. For the convenience of explanation, hereinafter, it will be described that the upper cover 210 is cut by the grinder, but should be understood that this is not intended to limit the scope of the invention.

The upper cover 210 of the housing 200 may be formed to be bent and coupled to the side cover 220 (see FIG. 3). In addition, the upper cover 210 may be coupled to the side cover 220 by welding at the bent portion. For example, the upper cover 210 may include a first coupling portion 211 and a second coupling portion 212. Here, the first coupling portion 211 may be coupled to an upper side of the side cover 220 based on FIG. 3, and the second coupling portion 212 may be bent from the first coupling portion 211 and coupled to a side surface of the side cover 220 based on FIG. 3. Here, a placing groove 223 (see FIG. 4) in which the second coupling portion 212 may be placed may be formed at the side surface of the side cover 220.

That is, the upper cover 210 may include a first coupling portion 211 having a flat plate shape and a second coupling portion 212 bent substantially perpendicularly from the end of the first coupling portion 211, and the second coupling portion 212 may be placed in the placing groove 223 formed in the side surface of the side cover 220. In addition, since the second coupling portion 212 bent from the first coupling portion 211 is bonded to the side surface of the side cover 220 by welding, the upper cover 210 is bonded to the side cover 220 by welding at the second coupling portion 212. If the upper cover 210 and the side cover 220 are coupled in this manner, the second coupling portion 212 of the upper cover 210 is bonded to the side surface of the side cover 220, but the first coupling portion 211 of the upper cover 210 is just in contact with the upper side of the side cover 220 and not bonded thereto.

Here, if a worker cuts the upper cover 210 by using the grinder along the guide groove 222 formed in the side cover 220, the second coupling portion 212 is still bonded to the side surface of the side cover 220, but the first coupling portion 211 not bonded to the side cover 220 may be released from the side cover 220. By doing so, the upper cover 210 may be separated from the side cover 220. Here, since the grinder moves along the guide groove 222, a portion of the side cover 220 (see the portion a in FIGS. 3 and 4) is located at a left side of the guide groove 222 based on FIG. 3. Thus, since the battery cell 110 is protected from the grinder by the portion of the side cover 220 (see the portion a in FIGS. 3 and 4), the battery cell 110 is prevented from being damaged while the housing 200 is disassembled, thereby preventing a fire from being caused by the damage of the battery cell 110.

In addition, referring to FIGS. 3 and 4, a cutting introduction groove 217 may be formed in the first coupling portion 211. The cutting introduction groove 217 may be formed in the first coupling portion 211 with a smaller size than the guide groove 222 at a position corresponding to the guide groove 222. The cutting introduction groove 217 guides a beginning point for cutting the upper cover 210 so that the grinding stone provided in the grinder may start cutting the upper cover 210 at a correct position.

Meanwhile, another embodiment of the welding coupling of the upper cover 210 and the side cover 220 will be described. Referring to FIGS. 3 and 4, the first coupling portion 211 may include an outer side portion 215 and an inner side portion 216. The outer side portion 215 is a portion that contacts the side cover 220 in a region close to the second coupling portion 212 based on the guide groove 222, and the inner side portion 216 is a portion that contacts the side cover 220 in a region far from the second coupling portion 212 based on the guide groove 222. In addition, the first coupling portion 211 may be bonded to the side cover 220 by welding at the outer side portion 215. That is, in the former embodiment, the upper cover 210 is bonded to the side surface of the side cover 220 by welding only at the second coupling portion 212, but in this embodiment, the upper cover 210 is bonded to the side cover 220 by welding at the outer side portion 215 of the first coupling portion 211 regardless of welding at the second coupling portion 212. That is, in this embodiment, after the second coupling portion 212 is bonded to the side surface of the side cover 220 by welding, the outer side portion 215 of the first coupling portion 211 may be bonded to the side cover 220 by welding. Alternatively, the second coupling portion 212 is not be bonded to the side cover 220, and only the outer side portion 215 of the first coupling portion 211 may be bonded to the side cover 220 by welding.

Meanwhile, in another embodiment, the upper cover 210 is provided as a flat plate without bending and is bonded to the side cover 220. In this embodiment, since the upper cover 210 is not bent, the upper cover 210 corresponds to the case where only the first coupling portion 211 is provided without the second coupling portion 212, compared to the above embodiment. In addition, the placing groove 223 is not formed in the side cover 220. Since the second coupling portion 212 is not present, the upper cover 210 may be bonded to the side cover 220 by welding only at the outer side portion 215 of the first coupling portion 211.

Hereinafter, the process of separating the upper cover 210 from the side cover 220 by cutting the upper cover 210 will be described in detail.

Figure 5:
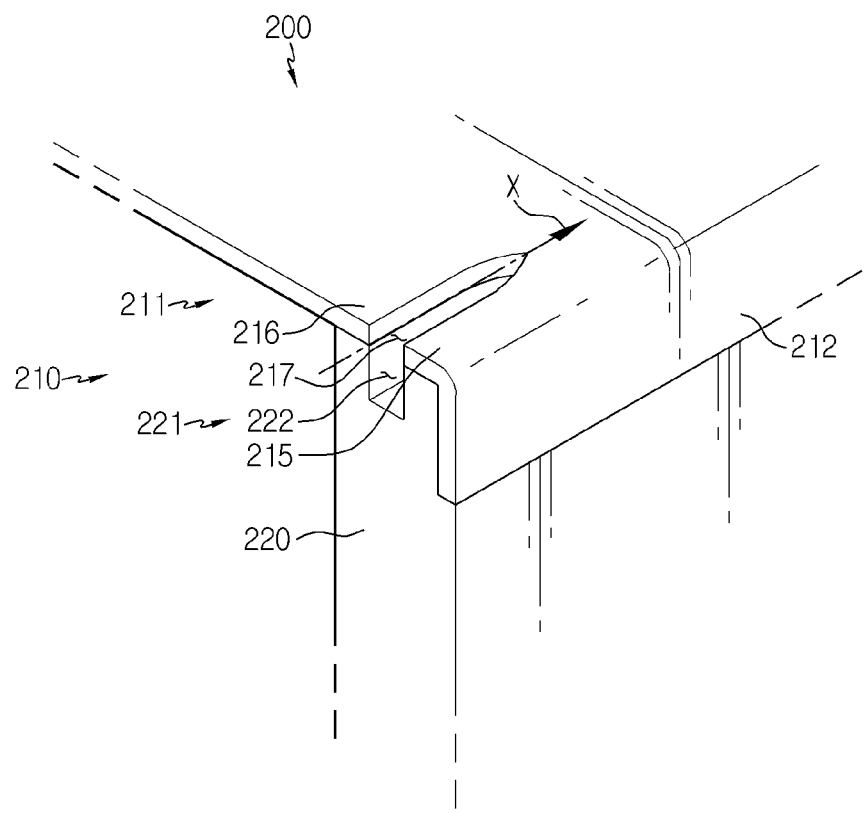
FIG. 5 is a schematic perspective view showing that the upper cover is cut along a disassembling guide in the battery module according to an embodiment of the present disclosure.
Figure 6:
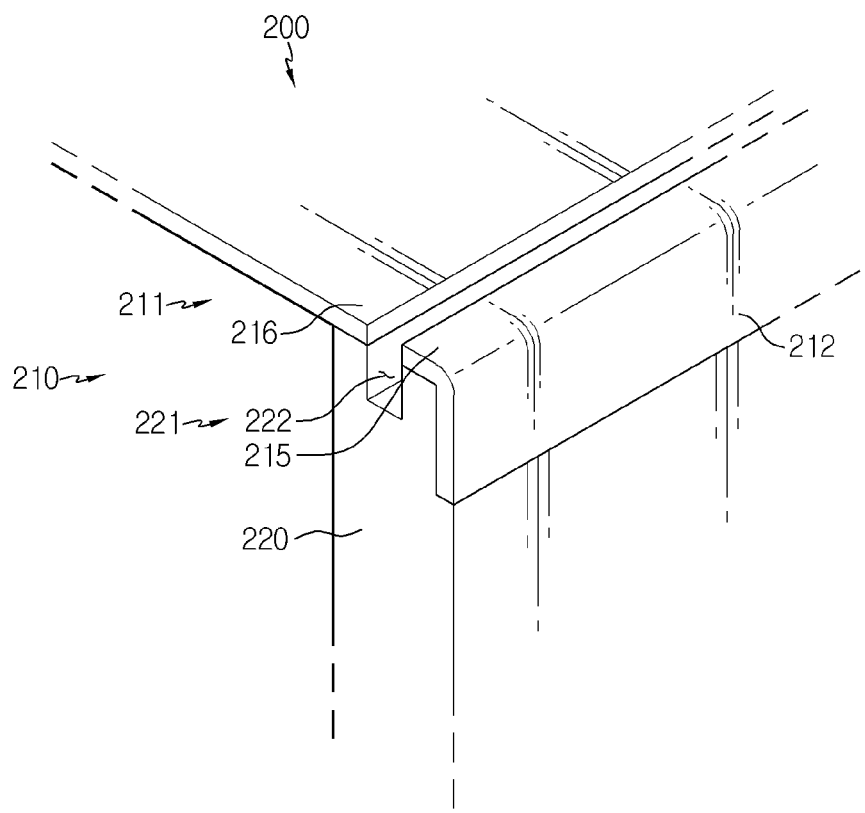
FIG. 6 is a schematic perspective view showing that the upper cover of FIG. 5 is completely cut.
Figure 7:
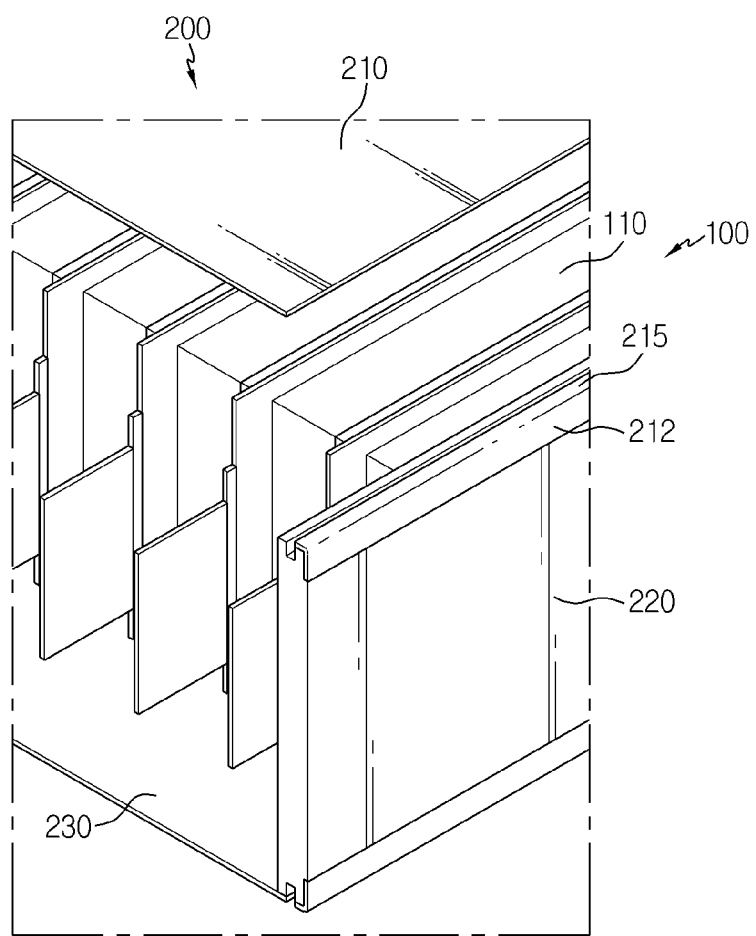
FIG. 7 is a schematic perspective view showing that the upper cover is cut and separated from the side cover in the battery module according to an embodiment of the present disclosure.

FIG. 5 is a schematic perspective view showing that the upper cover is cut along a disassembling guide in the battery module according to an embodiment of the present disclosure, FIG. 6 is a schematic perspective view showing that the upper cover of FIG. 5 is completely cut, and FIG. 7 is a schematic perspective view showing that the upper cover is cut and separated from the side cover in the battery module according to an embodiment of the present disclosure.

Though the grinder is not shown in FIG. 5, the following is the case where the upper cover 210 is cut while moving the grinder along an arrow X in FIG. 5. Referring to FIG. 5, the grinding stone provided to the grinder is inserted into the cutting introduction groove 217 formed in the first coupling portion 211 of the upper cover 210 to start cutting the upper cover 210, and the grinding stone cuts the upper cover 210 while moving along the arrow X of FIG. 5. Referring to FIG. 6, the upper cover 210 is completely cut by the grinder. Here, in the upper cover 210, the outer side portion 215 of the first coupling portion 211 and the second coupling portion 212 may be coupled to the side cover 220, and the inner side portion 216 of the first coupling portion 211 may be separated from the side cover 220. In addition, referring to FIG. 7, the upper cover 210 may be completely separated from the side cover 220, and the battery cell stack 100 accommodated in the housing 200 may be taken out of the housing 200. Here, since the grinding stone provided to the grinder moves along the guide groove 222 formed in the side cover 220, a portion of the side cover 220 (see the portion a in FIGS. 3 and 4) is positioned between the battery cell 110 and the grinding stone, and the battery cell 110 may be prevented from being damaged by the grinding stone by means of the portion of the side cover 220 (see the portion a in FIGS. 3 and 4). In other words, in the battery module 10 according to the present disclosure, since it is prevented that the battery cell 110 is damaged and fire occurs due to the damage of the battery cell 110, it is not needed to treat the battery cell 110 with a salt water and thus the battery cell 110 may be reused.

Meanwhile, a battery pack (not shown) according to an embodiment of the present disclosure, may include one or more battery modules 10 according to an embodiment of the present disclosure as described above. Also, in addition to the battery modules 10, the battery pack (not shown) may further includes a case for accommodating the battery modules 10, and various devices for controlling charge and discharge of the battery modules 10, such as a BMS, a current sensor, a fuse, and the like.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery module and a battery pack including the battery module and is particularly applicable to an industry related to a secondary battery.

What is claimed is:

1. A battery module, comprising:
a battery cell stack in which a plurality of battery cells are stacked; and
a housing configured to accommodate the battery cell stack,
wherein a disassembling guide for disassembling the housing is formed at the housing,
wherein the housing includes an upper cover, a lower cover and a first side cover,
wherein the disassembling guide is a guide groove formed in an upper surface of the first side cover,
wherein the guide groove has an inner edge and an outer edge, and
wherein the upper cover covers the inner edge and outer edge of the guide groove.

2. The battery module according to claim 1, wherein the guide groove is formed at a center portion of the upper surface of the first side cover.

3. The battery module according to claim 2, wherein the housing further comprises a second side cover, and wherein the upper cover is formed to be bent and coupled to the second side cover.

4. The battery module according to claim 2, wherein the first side cover includes an inner surface and an outer surface, and
wherein the upper cover includes:
a first coupling portion coupled to an upper side of the first side cover; and
a second coupling portion bent from the first coupling portion and coupled to the outer side surface of the first side cover.

5. The battery module according to claim 4, wherein a placing groove is formed at the outer side surface of the first side cover so that the second coupling portion is placed therein.

6. The battery module according to claim 4, wherein the upper cover is coupled to the first side cover by welding at the second coupling portion.

7. The battery module according to claim 4, wherein the first coupling portion includes:
an outer side portion configured to contact the first side cover in a region close to the second coupling portion based on the guide groove; and
an inner side portion configured to contact the first side cover in a region far from the second coupling portion based on the guide groove,
wherein the first coupling portion is coupled to the first side cover by welding at the outer side portion.

8. The battery module according to claim 4, wherein a cutting introduction groove having a smaller size than the guide groove is formed in the first coupling portion at a location corresponding to the guide groove.

9. A battery pack, comprising the battery module according to claim 1.

10. The battery module according to claim 7, wherein a cutting introduction groove having a smaller size than the guide groove is formed between the inner side portion and outer side portion at a location corresponding to the guide groove.

11. The battery module according to claim 1, wherein the guide groove divides the first side cover into an inner portion and an outer portion, and
wherein the upper cover is bonded to the outer portion and not bonded to the inner portion.

12. The battery module according to claim 1, wherein the upper cover has a depending flange, and
wherein the depending flange contacts a side surface of the first side cover.

13. A battery module, comprising:
a battery cell stack in which a plurality of battery cells are stacked; and
a housing configured to accommodate the battery cell stack,
wherein a disassembling guide for disassembling the housing is formed at the housing,
wherein the housing includes an upper cover, a lower cover and a side cover,
wherein the disassembling guide is formed at the side cover,
wherein the disassembling guide comprises a groove formed in the side cover, the groove dividing the side cover into an inner portion and an outer portion, and
wherein the upper cover is bonded to the outer portion of the side cover and not bonded to the inner portion of the side cover.

14. The battery module according to claim 13, wherein the groove is formed in a top edge of the side cover.

\* \* \* \* \*